United States Patent
Kruus et al.

(10) Patent No.: US 9,471,500 B2
(45) Date of Patent: Oct. 18, 2016

(54) BUCKETIZED MULTI-INDEX LOW-MEMORY DATA STRUCTURES

(71) Applicant: NEC Laboratories America, Inc., Princeton, NJ (US)

(72) Inventors: Erik Kruus, Hillsborough, NJ (US); Cristian Ungureanu, Princeton, NJ (US); Wen Xia, Princeton, NJ (US)

(73) Assignee: NEC Corporation (JP)

( * ) Notice: Subject to any disclaimer, the term of this patent is extended or adjusted under 35 U.S.C. 154(b) by 288 days.

(21) Appl. No.: 14/251,288

(22) Filed: Apr. 11, 2014

(65) Prior Publication Data

US 2014/0310476 A1 Oct. 16, 2014

Related U.S. Application Data

(60) Provisional application No. 61/811,271, filed on Apr. 12, 2013, provisional application No. 61/811,276, filed on Apr. 12, 2013.

(51) Int. Cl.
*G06F 12/08* (2016.01)

(52) U.S. Cl.
CPC .................. *G06F 12/0871* (2013.01)

(58) Field of Classification Search
None
See application file for complete search history.

(56) References Cited

U.S. PATENT DOCUMENTS

| 6,000,009 | A | 12/1999 | Brady |
| 6,519,052 | B1 | 2/2003 | Oneda et al. |
| 8,566,615 | B2 | 10/2013 | Balinsky et al. |
| 2011/0276781 | A1* | 11/2011 | Sengupta ............ G06F 12/0862 711/216 |
| 2014/0032569 | A1* | 1/2014 | Kim ..................... G06F 17/3033 707/747 |

OTHER PUBLICATIONS

Bonomi et al., "Beyond Bloom Filters: From Approximate Membership Checks to Approximate State Machines", SIGCOMM'06, Sep. 11-15, 2006.*
Debnath et al., "ChunkStash: Speeding up Inline Storage Deduplication using Flash Memory" Proceedings of the 2010 USENIX, Jun. 2010. (15 pages).
Fan et al., "MemC3: Compact and Concurrent MemCache with Dumber Cahing and Smarter Hashing" Parallel Data Laboratory, Carnegie Mellon University, Nov. 2012. (21 pages).
Lim et al., "SILT: A Memory-Efficient, High Performance Key-Value Store" Proceedings of the 23rd ACM Symposium on Operating Systems Principles, Oct. 2011. (13 pages).

(Continued)

*Primary Examiner* — Brian Peugh
*Assistant Examiner* — Tracy Chan
(74) *Attorney, Agent, or Firm* — Joseph Kolodka

(57) ABSTRACT

Systems and methods for generating and storing a data structure for maintaining cache supporting compression and cache-wide deduplication, including generating data structures with fixed size memory regions configured to hold multiple signatures as keys, wherein the number of the fixed size memory regions is bounded. A first mapping is generated from short-length signatures to a storage location and a quantized length measure on a cache storage device; and unused contiguous regions on the cache device are allocated. Metadata and cache page content is retrieved using a single input/output operation; a correctness of a full value of hash functions of uncompressed cache page content is validated; a second mapping is generated from short-length signatures to entries in the first mapping; and verification of whether the cached page content corresponds to a full-length original logical block address using the metadata is performed.

12 Claims, 6 Drawing Sheets

(56) References Cited

OTHER PUBLICATIONS

Lim et al., "Practical Batch-Updated External Hashing with Sorting" 2013 Proceedings of the Fifteenth Workshop on Algorithm Engineering and Experiments (ALENEX), Jan. 2013. (10 pages).
Lu et al., "BloomStore: Bloom-filter based memory-efficient key-value store for indexing of data deduplication on flash" In Mass Storage Systems and Technologies (MSST), 2012 IEEE 28th Symposium, Apr. 2012. (11 pages).
Saxena et al., "Flashtier: a lightweight, consistent and durable storage cache." In Proceedings of the 7th ACM european conference on Computer Systems, pp. 267-280. ACM, Apr. 2012.
Shimi et al., "Primary data deduplication-large scale study and system design." Proc. USENIX ATC, Jun. 2012. (12 pages).
Srinivasan et al., "iDedup: Latency-aware, inline data deduplication for primary storage." Proceedings of the 10th USENIX conference on File and Storage Technologies. USENIX Association, Feb. 2012. (14 pages).
Xia et al., "SiLo: a similarity-locality based near-exact deduplication scheme with low ram overhead and high throughput." Proceedings of the 2011 USENIX conference on USENIX annual technical conference. USENIX Association, Jun. 2011. (14 pages).
"Boost Multi-Index Contianers Library" http://www.boost.org/doc/libs/1_53_0/libs/multi_index/doc/index.html, Feb. 2006. (2 pages).
"Boost.MutliIndex Documentation—Tutorial 1.53.0", http://www.boost.org/doc/libs/1_53_0/libs/multi_index/doc/tutorial/index.html, Feb. 2006. (1 page).
"bcache/Design", http://bcache.evilpiepirate.org/Design, May 2013. (5 pages).

\* cited by examiner

BUCKETIZED MULTI-INDEX LOW-MEMORY DATA STRUCTURES

RELATED APPLICATION INFORMATION

This application claims priority to provisional application Ser. No. 61/811,271 filed on Apr. 12, 2013, and provisional application Ser. No. 61/811,276 filed on Apr. 12, 2013, both incorporated herein by reference.

BACKGROUND

1. Technical Field

The present invention relates to a low memory data structure, and in particular, to systems and methods for a bucketized multi-index low-memory data structure configured to store multiple keys.

2. Description of the Related Art

Flash memory Solid State Drives (SSDs) have gained increasing attention in recent years because of the increase in capacity, decrease in cost, and superior performance as compared to hard disk drives (HDDs). SSD storage is based on a semiconductor chip with physical properties which include compact size and shock resistance. The chips provide advantages in terms of high speed random reads and low power consumption as compared to traditional HDDs. However, SSDs present shortcomings such as having a limited number of write cycles and 'write amplification' due to internally managing data in large blocks.

SSDs have been employed to replace HDDs in storage systems, and attempts have been made to employ SSDs as cache devices to bridge the performance and cost gaps between main memory and HDDs. Data deduplication, a space-efficient technique, has been used to remove redundancy and to reduce storage cost in backup and archiving storage systems by employing a secure hash (also called a fingerprint) to uniquely identify a data chunk/file, and avoids a byte-by-byte comparison, thus improving the scalability of data reduction in large storage systems. In recent years, data deduplication has been implemented in primary storage systems to reduce the size of physical storage provisioned in a data center and storage servers. Data compression is a space-efficient technique that removes data redundancy at the byte level. Data compression has been used in daily file systems and has been adopted for network transmission and main-memory space saving.

SUMMARY

A method for generating and storing a data structure for maintaining a cache supporting compression and a cache-wide deduplication, comprising generating data structures with fixed size memory regions configured to hold multiple signatures as keys, wherein the number of the fixed size memory regions is bounded; generating a first mapping from short-length signatures to a storage location and a quantized length measure on a cache storage device; allocating unused contiguous regions on the cache device of a predetermined length; retrieving metadata and cache page content using a single input/output operation; validating a correctness of a full value of one or more hash functions of uncompressed cache page content using the metadata; generating a second mapping from short-length signatures to entries in the first mapping, wherein one or more pointers to entries in the first mapping are stored in a non-transitory computer readable storage medium; and verifying whether the cached page content corresponds to a full-length original logical block address (LBA) using the metadata.

A system for generating and storing a data structure for maintaining a cache supporting compression and a cache-wide deduplication, comprising: one or more data structures with fixed size memory regions configured to hold multiple signatures as keys, wherein the number of the fixed size memory regions is bounded; a mapping generator configured to generate a first mapping from short-length signatures to a storage location and a quantized length measure on a cache storage device, and to generate a second mapping from short-length signatures to entries in the first mapping, wherein one or more pointers to entries in the first mapping are stored; a content retrieval module configured to retrieve metadata and cache page content using a single input/output operation; a validation module configured to validate a correctness of a full value of one or more hash functions of uncompressed cache page content using the metadata; and a verification module configured to verify whether the cached page content corresponds to a full-length original logical block address (LBA) using the metadata.

A method for reducing memory and resource costs for a bucketized multi-index data structure, comprising storing multiple key types concurrently in one or more individual buckets in a non-transitory computer readable storage medium; performing a lookup of a first value of information for one or more data positions (DPs) using a first key for one of more content addresses (CAs); performing a lookup of a second value of information for one or more DPs using a second key for one or more logical block addresses (LBAs) by referring to the CAs; compressing one or more of LBA information, CA information, and bucket header information, or portions thereof; and evicting information from buckets to cause a ratio of LBA keys to CA keys in each bucket to approach a global ratio of LBA keys to CA keys.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
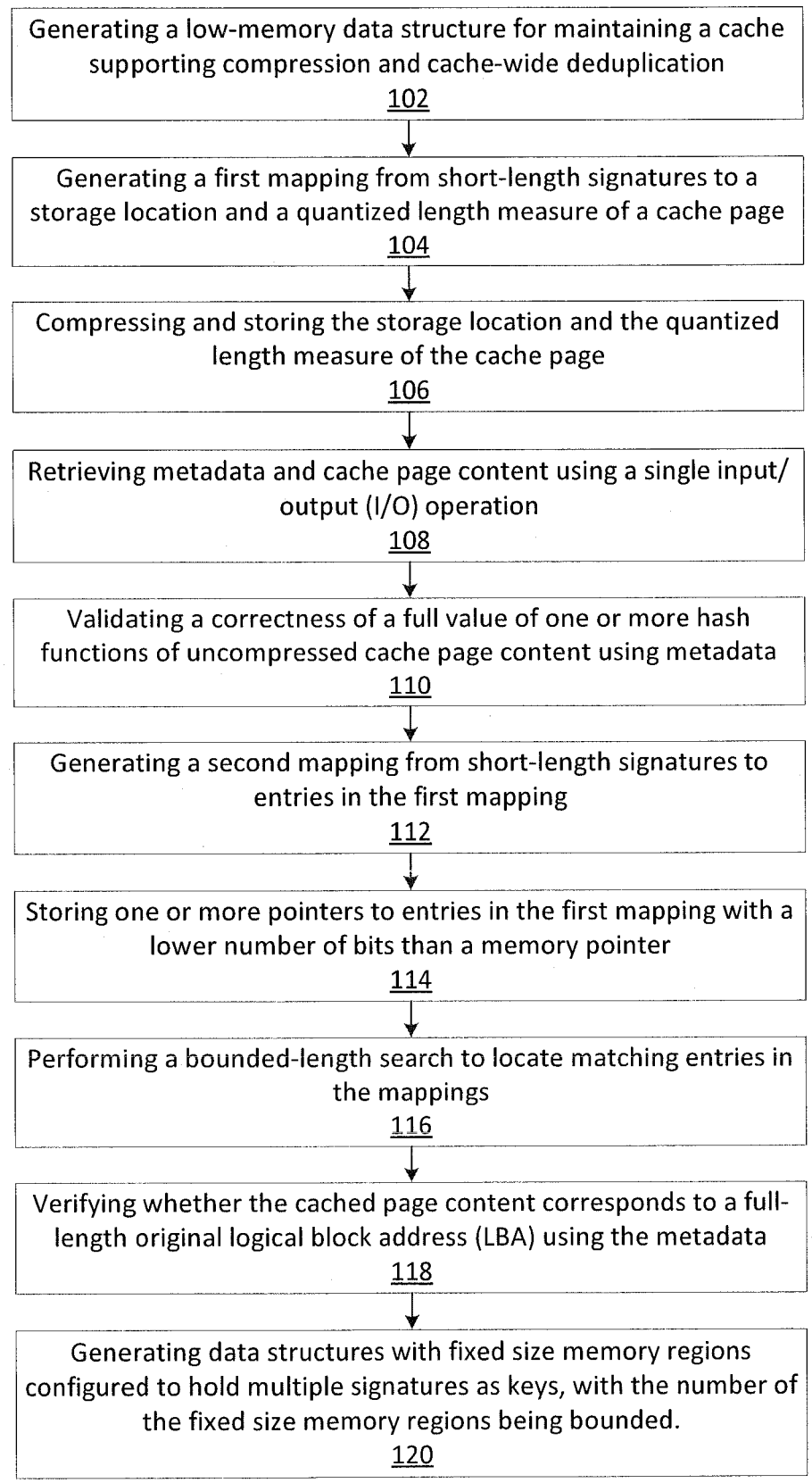
FIG. 1 shows a block/flow diagram illustrating a method for reducing memory and resource costs for multi-index data structures according to the present principles.

To maximize the space efficiency of solid state drive (SSD) caches, data deduplication and compression may be combined according to one embodiment, thus enabling SSD caches to be more performance- and cost-effective. Using deduplication in SSD caches may enable more logical block addresses (LBAs) which have a same content address (CA). Using compression in SSD caches may enable a reduction in the input/output (I/O) size in an SSD device. To cache the same working set, the number of SSD devices (i.e., the cost) may be reduced by deduplication and compression. Using the same size of SSD devices, combining deduplication and compression may enable a user to cache more objects (i.e., the performance) according to one embodiment.

There exist many challenges in applying data deduplication and compression in SSD caches. This is because the performance gains of deduplication and compression depend on the I/O workloads. Introducing these techniques in SSD caches may increase the central processing unit (CPU) (i.e., computing) and random access memory (RAM) (i.e., indexing) overheads in the I/O path, which may increase the I/O latency if the I/O objects are, for example, uncompressible and non-duplicate. First, data compression results in variable-sized data blocks, which may need additional indexing overhead. Second, data deduplication generates CAs as the unique and primary keys in SSD caches instead of conventional LBAs, which increases computational and indexing overheads.

In one embodiment, to implement SSD caches with deduplication and compression, efficient in-memory mappings of LBA→CA ($LBA_{idx}$) and CA→Data Position (DP) ($CA_{idx}$) may be employed to find potential cache hits, where 'idx' is an index value of LBA or CA. The purpose of such mappings is to ensure that I/O requests are satisfiable from the SSD cache by client read and write operations. CA→DP may map the position of unique blocks with its fingerprints in SSD caches, and LBA→CA may map the deduplication relationships of LBAs and CAs. To save memory, $LBA_{idx}$ and $CA_{idx}$ may be pointerless, bucketized hash tables that store the keys as short signatures (sig) formed of a subset of bits from LBA hash values ($LBA_{sig}$) and CA hashes ($CA_{sig}$). Since CAs are generally quite long, the $LBA_{idx}$ value type is actually a pointer to a $CA_{idx}$ entry. The disk pointer DP value type for $CA_{idx}$ is also stored compactly. DP information stores a bucket-relative sector offset and a short length code, and all the DPs for a bucket are stored in a simple compressed format within the bucket header. Holding an allocation map per bucket that handles a relatively small SSD region allows quick eviction and allocation.

In one embodiment, the problem to be solved is how to store a map1 (e.g., K1->K2) and a map2 (e.g., K2->data) within preallocated memory while avoiding memory underutilization for one key or the other as the ratio of map1 entries to map2 entries varies in time. This particular posing of the problem is the way it appears when applied to deduplicated caching applications. However, a generic approach may be applied within other data structures. For example, if one expects a deduplication ratio of 2:1, one may preallocate map1 K1->K2 with twice the number of entries as the map2 K2>data. However, if the real deduplication ratio is 1:1, the map1 will be half full when map2 is full, and if the real deduplication ratio is 4:1, then the map2 will be half full when map1 is full. The conventional approach of coordinating operations using two separately allocated structures (map1 and map2) would waste valuable memory resources.

A more general way to view the problem is to consider arbitrary applications that require information retrieval based on two indices (e.g., K1 and K2). A subset of such problems may also desire (e.g. to keep maximum latency low) to avoid dynamically resizing either data structure. When the relative numbers of items of type K1 and K2 cannot be accurately predicted, storing items of type K1 and K2 into a fixed partitioning of memory can lead to memory for one type of key to be exhausted, leaving a potentially large amount of unused memory for the other key.

A large number of memory structures contain internal pointers, leading to undesirably large memory usage. Advantageously, the present principles can be applied to pointerless variants of tree structures or hash tables that operated within a pre-allocated memory bound, a situation particularly relevant for large data structures where memory usage is an issue. In one embodiment, to force an insertion operation to succeed, a method to select a key to be erased from within a select of mapping keys of differentiated types, for example K1 and/or K2, may be present. This is the case, in particular, in data structures that manage metadata for cached objects (e.g. CLOCK, FIFO, random eviction policies, etc.).

As applied to deduplication, a data structure storing selections of key of various type may, for example, in a first step select a key type to be erased so as to guide the ratio of keys of various types within each selection toward a slowly varying ratio. For example, the slowly varying key ratio guiding selection of which type of key to erase could be 2:1 or 4:1 for the scenarios of paragraph [0018]. In a second step, a particular key of this selected key type may be chosen, possibly using additional metadata for cached objects, in accordance with a caching policy (e.g. LRU, CLOCK, FIFO, etc.). The caching policy may be different for each of the differentiated types within the set of mapping keys of differentiated types, from which an eviction candidate is to be selected.

Efficient management of large numbers of cached objects requires a correspondingly large amount of memory for metadata. Provisioning this memory may lead to increased system cost. Alternatively, given a bound on memory utilization, one may be severely limited in the size of cache that can be efficiently managed. Deduplication of cached content may lead to even higher metadata overhead than for non-deduplicated caches, which can lead to even higher memory requirements for the storage of metadata. To operate with low latency, avoiding conventional data structures which may be slow to dynamically resize, particularly in multi-threaded usage, is beneficial. Cache content may be stored on lower speed devices (such as an SSD cache to speed access to HDD data in tiered storage). Retrieval of cached items should be possible in a minimum number of I/Os per second (iops) because the number of iops an SSD is capable of supporting may be limited. In one embodiment, frequent re-writing of SSD data that has been stored in a compressed format is avoided, and geared toward read-only operations to lower memory cost.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now in detail to the figures in which like numerals represent the same or similar elements and initially to FIG. 1, a block/flow diagram illustrating a method for reducing memory and resource costs for multi-index data structures is illustratively depicted according to the present principles. In one embodiment, an efficient deduplicated external cache of objects may be employed using a minimal amount of dynamic random-access memory (DRAM), which is sufficient to indicate with a high probability (e.g., 99% chance) of correctness the presence and location of cached content is reserved. If 'probably' existent, cached content and metadata which is sufficient to verify the content are retrieved in block. Hash tables of fixed size are generated, and these hash tables store hash-key prefixes of keys which are either LBAs or deduplicated CAs. LBA lookups are performed for client operations, and CA lookups are performed for deduplication functions. A new cache entry may be inserted after removing (e.g., evicting) another entry as the hash tables are not resizable.

In one embodiment, a low-memory data structure for maintaining a cache supporting compression and cache-wide deduplication may be generated in block 102. A first mapping may be generated and/or maintained from short-length signatures (e.g., $CA_{sig}$) based on a hash function of uncompressed page content to a storage location and a quantized length measure of a cache page on a cache storage device in block 104, wherein the cache page may be compressed. The storage location and quantized length measure information may be stored in a compressed format in block 106, and may be employed to communicate information to efficiently allocate unused contiguous regions on the cache storage device of a designated length. A single input/output (I/O) operation may retrieve both metadata and cache page content in block 108, where metadata is employed to further validate the correctness of the full value of the hash function of uncompressed cache page content (e.g., the full-length value used to form $CA_{sig}$ in block 110.

In one embodiment, a second mapping may be generated and/or maintained from short-length signatures based on a hash function of logical block addresses of client I/O operations to entries in the first mapping in block 112, and a pointer to entries in the first mapping may be stored with a lower number of bits than a memory pointer (e.g., bucket number+$CA_{sig}$) in block 114, and may include a bounded-length search to locate a matching entry in block 116. After retrieving at least the metadata by the single I/O operation to the cache storage, the metadata information may be employed to check whether the cached page content corresponds to the full-length original LBA of the client I/O in block 118. The first and second mappings may be implemented using data structures whose leaves are fixed size memory regions capable of holding multiple signatures as keys (e.g., a bucketized hash table), and the number of such memory regions is bounded so as to bound the maximum memory used by the two mappings in block 120. In this embodiment, the first and second mappings are statically sized hash tables (e.g., d-left hash tables) with zero internal pointer overhead, and they are never resized or reallocated.

Figure 2:
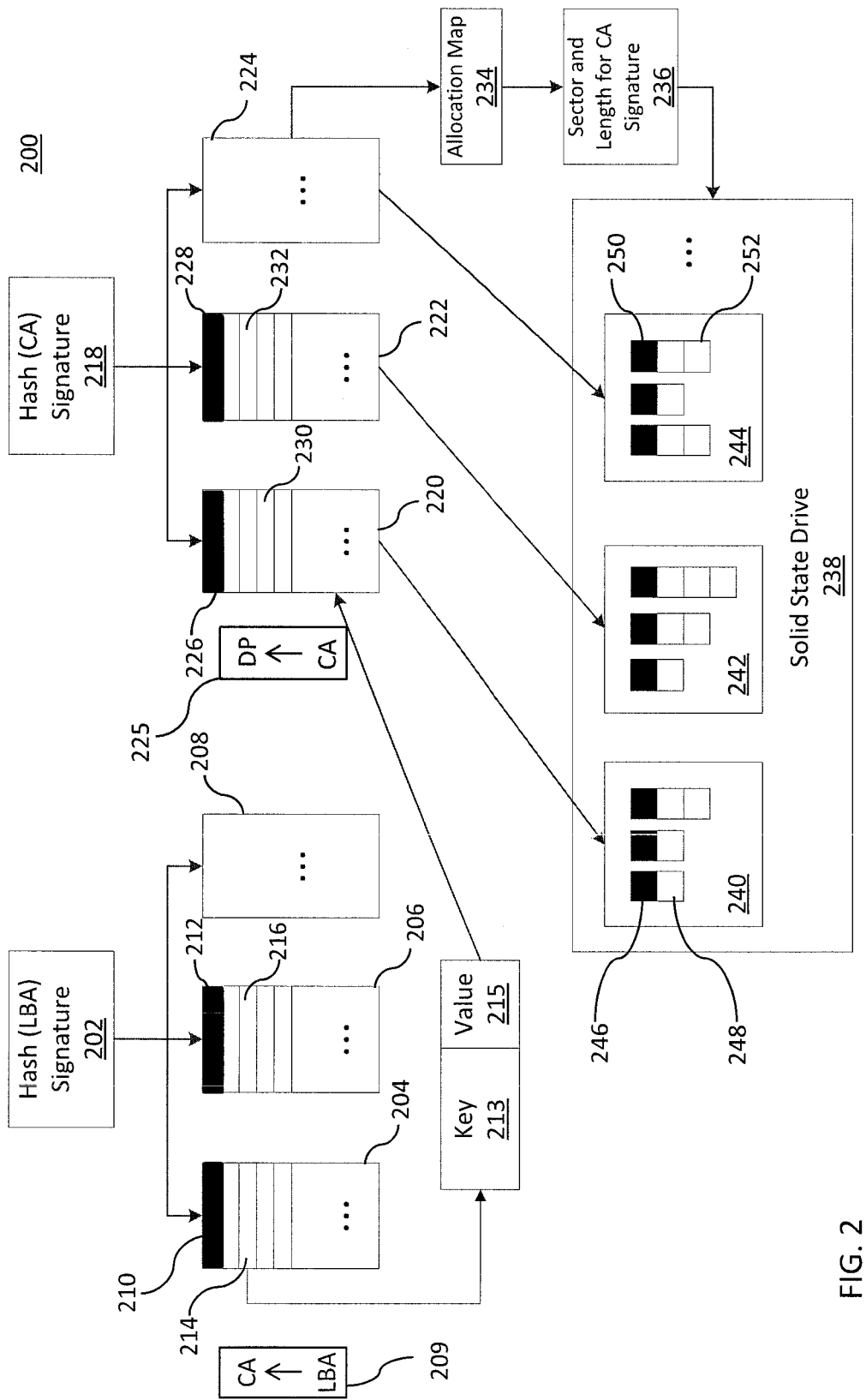
FIG. 2 shows a block/flow diagram illustrating a system/method for indexing logical block addresses (LBAs), content addresses (CAs), and data positions (DPs) according to the present principles.

Referring now to FIG. 2, a system/method for indexing logical block addresses (LBAs), content addresses (CAs), and data positions (DPs) is illustratively depicted according to the present principles. In one embodiment, to reduce the memory usage for hash tables of the indices for LBA and CA ($LBA_{idx}$ and $CA_{idx}$), only the prefixes (e.g., signatures) of LBA and CA are stored as a Key of $LBA_{idx}$ and $CA_{idx}$ in memory. If the signatures $LBA_{sig}$ 202 and $CA_{sig}$ 218 match in $LBA_{idx}$ and $CA_{idx}$ (not shown), a full CA and LBA comparison with SSD metadata to verify the hash validity with the block metadata may be performed.

In one embodiment, a hash (LBA) signature 202 may be entered into one or more buckets 204, 206, 208, which may include one or more bucket headers 210, 212 and one or more entries 214, 216. A mapping from LBA to a CA pointer may occur in block 209. A hash (CA) signature 218 may be entered into one or more buckets 220, 222, 224, which may include one or more bucket headers 226, 228 and one or more entries 230, 232. An allocation map 234 may be generated and a sector offset and length for a CA signature may be determined in block 236. The allocation map may be stored within bucket headers 226 and 228 in a compressed format to save memory. Memory may also be saved by allowing a minimal number of allowed values for the compressed length. The allocation map 234 may be a bucket to SSD allocation map, and may read exactly one, or more than one memory address. A mapping from CA to a DP may occur in block 225, and may map to an address on an SSD device 238.

In one embodiment, the SSD 238 stores metadata and/or other types of data in blocks 240, 242, 244, and bits may be stored in memory maps 209 and 225 that allow a 'probably correct' determination of metadata and data locations, 246 and 248 respectively, on SSD 238. Probably correct refers to a statistical expectation about the probability of correctly forming a hypothesis about DP based on the bits (LBA and CA signatures) which are stored in memory. These statistical expectations may be calculated by assuming that hash functions used in generating LBA and CA signatures are distributed randomly, forming uniform distributions.

For example, one may design a data structures 202 and 218 where the probability of correctly ascertaining an SSD pointer DP is higher than a given threshold, for example, 99%, by analyzing the number of keys within buckets and the bit lengths of uniformly distributed signature bits., Metadata block[s] 246 associated with data block[s] 248 may store additional bits, for example full-length CA and LBA values, that allow one to ascertain whether a probably correct DP value determined from mappings 202 and 218 is correct for sure.

In one embodiment, metadata 246, 250 may be employed to handle false positives efficiently by maintaining a bounded amount of metadata in main memory, and may be configured to store the bulk of metadata in SSD storage. The metadata 246, 250 may be located adjacent to data blocks 248, 252 to enable reading and writing of the data all in one action, which minimize SSD iops and may minimize time spent.

In one embodiment, to reduce the memory usage for hash tables of $LBA_{idx}$ and $CA_{idx}$, only the prefixes (signatures) of LBA and CA are stored as the KEY of $LBA_{idx}$ and $CA_{idx}$ 213, 215 in the memory. If the signatures $LBA_{sig}$ and $CA_{sig}$ 213, 215 match in $LBA_{idx}$ and $CA_{idx}$, the full CA and LBA comparison with SSD metadata may be performed (and optionally a memcmp with existing SSD data) to verify the hash validity with the block metadata. Note that the hash functions employed for the LBA is a nontrivial one (e.g., unlike MemCached which uses a simpler modulo-based function to specially handle sequential LBAs), while the hash function for CAs can be a trivial one, since the CAs may already be random bit sequences.

In one embodiment, the system and method according to the present principles delineates a small amount of memory data sufficient to indicate with a high probability of correctness, the presence and location of cached content. If probably existent, cached content and metadata sufficient to verify the content are retrieved. It is assumed that some amount of a cache device (SSD) 238 may support fast random I/O to support fast read/write operations on metadata and data blocks 246-248 and 250-252, thereby allowing retrieval of cached data and metadata with a single I/O operation to an SSD 238, using, for example, approximately 3 bytes/item of memory for the deduplication table 225. Approximately 6 bytes/item of memory may be allocated for the logical block address translation table 209, and compression of deduplicated data may also be employed.

Such low memory usage is beneficial in constructing caching technologies in which writes and cache churn are high. In contrast with conventional log-structured approaches, rewrites may be avoided, and at most one SSD I/O may be guaranteed while satisfying a client read/write operation. The present principles guarantee that data written to cache is never read and rewritten elsewhere, in contrast to existing log-structure merge tree approaches.

In one embodiment, memory is used for hash tables that store hash-key prefixes of keys which are either logical block addresses (LBAs) or deduplicated content addresses (CAs). LBA lookups are employed for client operations, while CA lookups are employed for the deduplication function. The hash-key prefixes may be under 2 bytes each, while the full sizes of LBA and CA may typically be 8 bytes and 20 bytes. This is a large single source of memory efficiency. Further memory efficiency is obtained by using an eviction scheme (like CLOCK or FIFO) which uses few bits and few internal pointers. The hash tables themselves may be of fixed size and may contain no internal pointers, which enables further memory reduction and allows for low memory usage.

In one embodiment, the probably-correct accesses to data locations on SSD retrieve both the probably correct content as well as metadata used to verify the probably correctly-retrieved content using a single I/O operation. This metadata may include the full-length CA and list of known LBAs that map to that cached content block. This allows low Input/Output Operations Per Second (iops) to the SSD cache. For low latency, the number of SSD locations that need to be queried to determine whether a probably cached object does indeed exist may be limited. In particular, the maximum number of SSD accesses may be held to one, with a very low false positive probability (e.g., under 0.8%). An in-memory data structure, along with SSD metadata and data layout, may enable saving of CPU resources by: (i) replacing the SHA-1 hash function with a non-cryptographic hash function (e.g., SpookyHash), and (ii) performing an explicit memory compare of data content as an additional step in verifying that a content page is indeed a true duplicate.

When inserting a new cache entry, a selection may be made of a (likely 'older') item to remove from the cache to make room for the incoming object. The hash tables neither require nor support a 'resize' operation, do no memory allocation for metadata, and can use fine-grained locking of buckets, which enables lower latency. Latency can be further minimized by replacing a typical secure hash algorithm (e.g., SHA-1) hashing function that generates CAs with a much faster, shorter hash (e.g., SpookyHash, MurmurHash3, or xxhash) where memory comparison (memcmp) is used to deal with the case of collisions of the full-length CA.

In one embodiment, an LBA signature uses 12 bits. The pointer to a CA entry is a CA bucket number (e.g., of size 22 bits—enough for a very large cache) and 12 CA signature bits, rather than a conventional pointer size (e.g. 64 bits). The CA signature is also only 12 bits (instead of, for example, 160 bits required for SHA-1). The Bucket→SSD allocation map may also be compressed (e.g., to 7 bits per entry). Between 4-12 bytes are used per bucket for locking and eviction information, and the total number of bits employed in this embodiment (with some possible padding of bits for memory alignment), ends up at approximately 9 bytes of memory per unique (undeduplicated) LBA+CA pair.

In one embodiment, the method for handling false positives efficiently using the above low-memory data structure at various phases of handling client read and write operations includes accessing at most one SSD region. In the client read fast-path, only a single SSD read operation is employed per cache page hit. For writes, 1-2 SSD accesses may be employed; however, to satisfy a client I/O operation, at most one SSD operation is required in the client fast-path. Management of indices is simplified even further by performing zero SSD rewrites, thereby enabling lower latency and lower memory requirements than conventional systems. A full index memory may also be maintained, without paging indexing information to an SSD, performing sparse indexing, or requiring separate SSD I/O to manage metadata.

Figure 3:
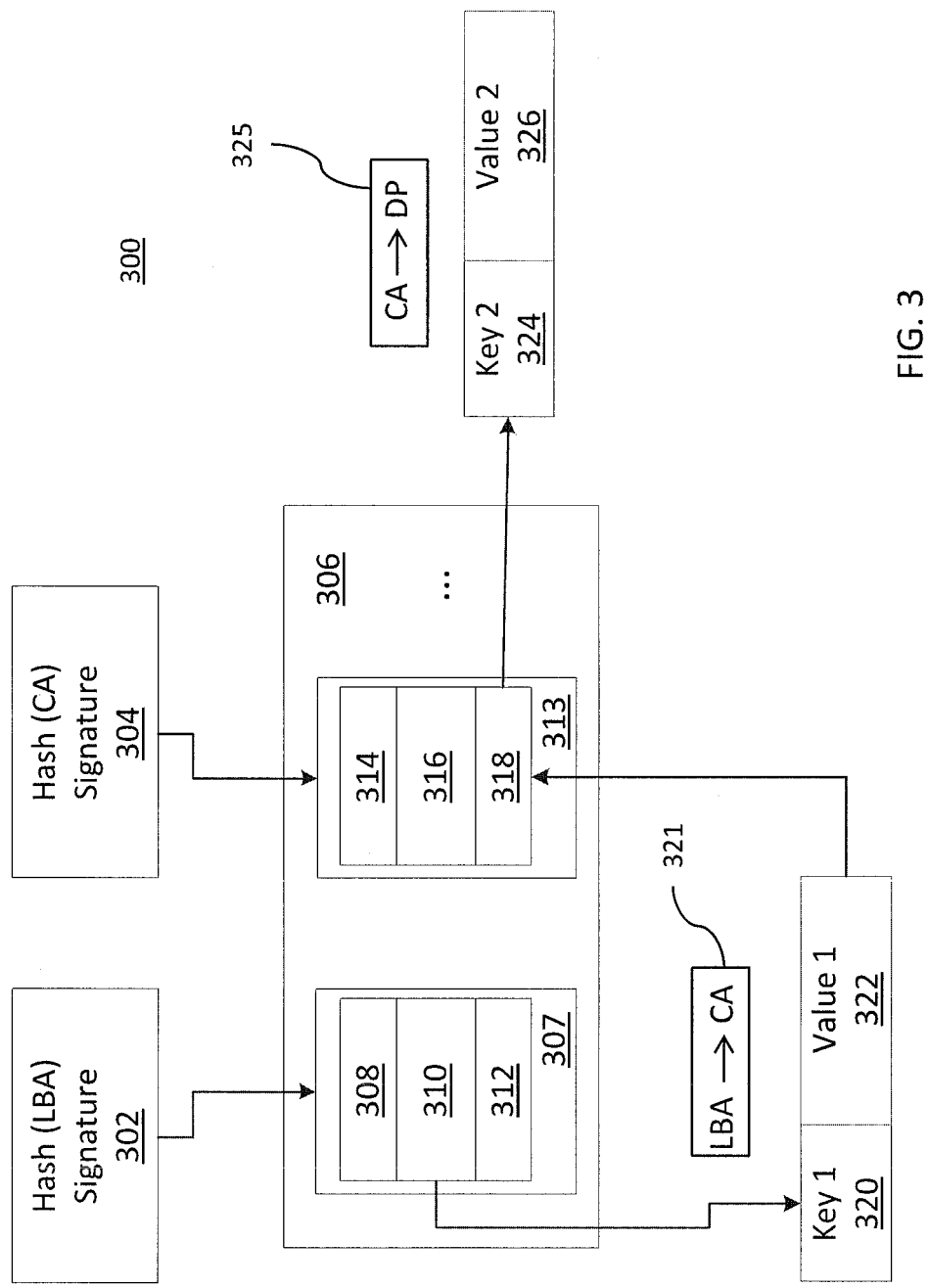
FIG. 3 shows a block/flow diagram illustrating a system/method for reducing memory and resource costs for bucketized multi-index data structures storing multiple key types in each bucket according to the present principles.

Referring now to FIG. 3, a block/flow diagram illustrating a system/method for reducing memory and resource costs for bucketized multi-index data structures storing multiple key types in each bucket 300 is illustratively depicted according to the present principles. Conventional data structures generally include internal pointers, which may lead to undesirably large memory usage. In one embodiment, the present principles may be applied to pointerless variants of data structures (e.g., tree structures, hash tables, etc.) that operate within a pre-allocated memory bound, which is particularly advantageous in situations where memory use is a priority.

In one embodiment, a bucketized data structure 306, that may include a hash (LBA) signature 302 and a hash (CA) signature 304, may be employed as input to one or more bucketized, pointerless hash tables of fixed size 307, 313, and may include one or more bucket headers 308, 314. The amount of memory allocated for LBA information 310, 316 and CA information 312, 318 may be adjusted to maintain high memory efficiency, and there may be a variable number of items for LBA 310, 316 and CA information 312, 318 overall. The LBA information 310 may include an LBA signature 320 and a value for a CA bucket when LBA→CA in block 321, and the CA information may include a CA signature 324 and a value for SSD location information 326 when CA→DP in block 325. It is noted that different data types may be stored in the same buckets 307, 313 in the bucketized data structure 306 according to one embodiment of the present principles.

In one embodiment, as cached blocks may be indexed by combining $LBA_{idx}$ and $CA_{idx}$ queries, deleting deduplicated and compressed blocks in SSD caches may be performed differently than by using conventional deletion and eviction methods. According to the present principles, deletion and eviction may be applied within individual buckets, rather than globally. There may be a plurality of instances in which LBA/CA eviction may occur according to the present principles, which may include, but are not limited to, $LBA_{sig}$/$CA_{sig}$ prefix collisions, and allocations when a bucket is not able to allocate SSD space for a disk pointer DP of sufficient size for metadata and/or data blocks.

Upon prefix collisions of LBA/CA in $LBA_{sig}$/$CA_{sig}$, an old item may be erased and a new item may be inserted. This may leave stale entries in the other data structure. To simplify concurrency and to reduce SSD I/Os, a lazy eviction/cleanup of LBA entries may be performed as follows. For LBA collisions, the previous LBA record ($LBA_i$⇔$CA_j$) may be deleted in $LBA_{idx}$. As the $CA_j$ entry may be shared by other LBAs, eviction of the stale $CA_j$ may be postponed until CA allocation encounters a full bucket and ages out of $CA_j$ due to inactivity. For CA eviction, in one embodiment, only a previous $CA_{sig}$ record in $CA_{idx}$ is deleted. As the full CA→LBAs information may be within metadata on SSD, it would be costly to clean up $LBA_{idx}$ immediately and/or all at the same time. Instead, stale LBA entries may be removed whenever insertion encounters a full $LBA_{idx}$ bucket (e.g., lazily) by checking the validity of CA bucket number and signature ($CA_{sig}^{bkt\#}$) pointers into $CA_{idx}$.

In one embodiment, when $LBA_{idx}$ and $CA_{idx}$ buckets are full, insertion may employ eviction and allocation routines. For LBA allocation in a particular bucket, records LBA→$CA_{sig}^{bkt\#}$ are first deleted by deleting entries whose $CA_{sig}$ is no longer present within the $CA^{bkt\#}$ bucket. If this fails to free up space in $LBA_{idx}$, an LBA may be deleted via least recently used (LRU) methods. As LBA bucket entries may be reordered at will, this does not require additional memory. CA allocation requires space in memory for the entry, consistent with a location for metadata and content on an SSD. In this embodiment, first in first out (FIFO) eviction may be employed, wherein the oldest written slots are evicted sequentially until there are enough contiguous sectors to accommodate the new metadata and compressed cache content. It is noted that a plurality of types of eviction schemes may be employed according to the present principles. For example, a CA-CLOCK eviction scheme may be employed which considers the compressed size, temporary locality, and spatial locality as CLOCK bits for CA allocation. Fresh insertions may set the clock bit for an entry, a CLOCK hand may traverse CLOCK bits, and if it encounters a zero CLOCK bit, that CA slot may be evicted and a region view may be updated. Otherwise, a nonzero CLOCK bit may be decremented. This CA-CLOCK eviction may be continued until allocation of a contiguous SSD region succeeds.

In another embodiment, a plurality of data structures of fixed size that allow a key to occupy one of several possible locations (e.g., buckets in a hash table or a vector-based binary tree, cuckoo hashing and variants, etc.) may be constructed. For clarity of discussion, a preallocated, bucketized, pointerless hash table of fixed size is employed according to the present principles in the following example. Rather than being required to maintain two separate hash tables for two different data types as in conventional systems, a single hash table including different data types may be employed. The buckets remain of fixed total size, which enables the system/method according to the present principles to function without pointers. However, unlike a conventional bucketized hash table which contains a fixed maximum number of objects of a single key type, each bucket according to the present invention may contain information about a variable number of keys (e.g., K1) and a variable number of different keys (e.g., K2).

In one embodiment, K1 operations for this multi-index container use the K1 information for K1 operations, ignoring the K2 content, and vice versa for the K2 operations. As the relative global number of K1 keys (e.g., wrt. K2 (K1/K2)_{global}) keys changes slowly, when a decision is made about a key to evict from any particular bucket, it is made so as to make the (K1/K2)_{bucket} move closer to the target value (e.g., (K1/K2)_{global}). Deciding which particular key to evict thereafter is problem specific (e.g. random or based on supplemental information such as CLOCK bits or FIFO per key type).

In this embodiment, local, single-point decisions (made on a per-bucket basis) keep the amount of memory used for K1 or K2 storage close to optimal, so that one key-memory is not 'full' while a second disjoint key-memory becomes underutilized, which would result in high memory costs. The price paid for this may be in CPU cycles to unpack and pack the variable amounts of K1 and K2 information in each bucket. However, in applications like caching, the latency of such operations may be much lower than the latency of I/O operations and as such, is of little importance.

In one embodiment, by employing pre-allocated memory for multi-index data structures that share buckets for keys of different types, the system/method according to the present principles stores keys of multiple types (e.g., 2) in each bucket (e.g., memory allocation unit) of a single data structure instead of distinct buckets of separate data structures, any wasting of memory is minimized. This results in the ability to lookup more distinct data values as the ratio of indices of each key type varies in time. Neither key becomes a 'bottleneck' as far as memory usage is concerned, and employing a bucketized data structure with multiple keys allows optimizations such as, for example, bucket-scale compression to store a variable number (e.g., more) keys per bucket.

Figure 4:
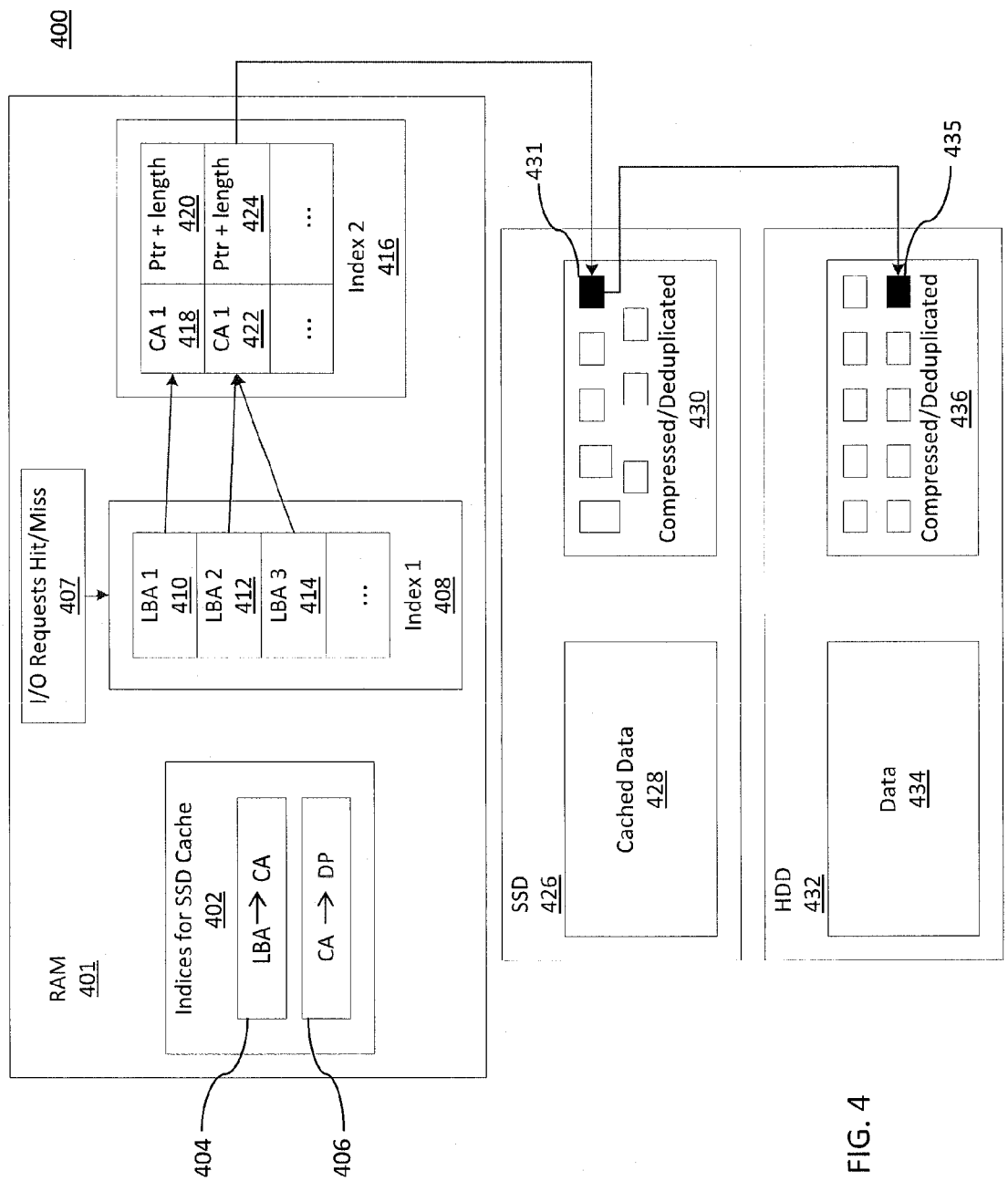
FIG. 4 shows a block/flow diagram illustrating a high-level representation of an architecture of a deduplicated and compressed solid state drive (SSD) according to the present principles.

Referring now to FIG. 4, a block/flow diagram illustrating a high-level representation of an architecture of a deduplicated and compressed solid state drive (SSD) 400 is illustratively depicted according to the present principles. In one embodiment, an SSD cache may include indices for an SSD cache 402 (e.g., LBA→CA 404 and/or CA→DP 406), one or more SSD cache devices 426 (which may include cached data 428 and/or compressed/deduplicated data 430), and one or more hard disk drive (HDD) primary devices 432 (which may include any type of data 434 including compressed/deduplicated data 436). In one embodiment, random access memory (RAM) 401 may store LBA→CA 404 within $LBA_{idx}$ 408 and CA→DP 406 within $CA_{idx}$ 416.

In one embodiment, only 12-bit signatures are stored in both Index 1 (e.g., $LBA_{idx}$) 408 and Index 2 (e.g., $CA_{idx}$) 416 instead of conventional keys (e.g., 64-bit, 160-bit, etc.), which contributes to lower memory usage. $LBA_{idx}$ 408 and $CA_{idx}$ 416 may themselves be d-left hash tables, which are one data structure supporting bounded time lookup with no internal pointer overhead. The pointers (not shown) may also be stored using a minimum of bits (e.g., a bucket number and CA signature bits only). Furthermore, the SSD pointer locations and length information 420, 424 may also be stored using few bits. To maintain a probably correct traversal of the Indices 1 and 2, if one increases the bucket size, more bits may be required for LBA or CA signatures to maintain a low probability of false positives when accessing SSD metadata and data. The system and method according to the present principles enable these features by associating each bucket with a predetermined number of SSD sectors 430, and then each CA 418, 422 is associated with offset and length relative to a relatively small (e.g., compressed) bucket area on an SSD 430, wherein the relatively small bucket area may be a predetermined number of SSD sectors with particular content addresses 431. I/O requests may hit or miss in block 407.

In one embodiment, an SSD 426 caches data blocks in block 428 to improve I/O performance. Deduplication and compression may occur in block 430, and may maximize the logical cache space, and thus enhance performance. The above-mentioned $LBA_{idx}$ 408 and $CA_{idx}$ 416 may be looked up to determine whether I/O requests have hit or miss in the SSD caches, and to verify correctness of the access by a comparison with a prepended metadata sector. A HDD 432 may be employed to store all data blocks 434 in the primary block device, and may include compressed/deduplicated data 436 and HDD sectors with content addresses 436. The cache may implement either write-back or write-through policies; however, write-through policies may be simpler to implement, and may save memory resources because dirty/clean cache items need not be tracked.

It is noted that while the above data structure and memory configurations are illustratively depicted, other sorts of data structures and memory configurations may also be employed according to the present principles.

Figure 5:
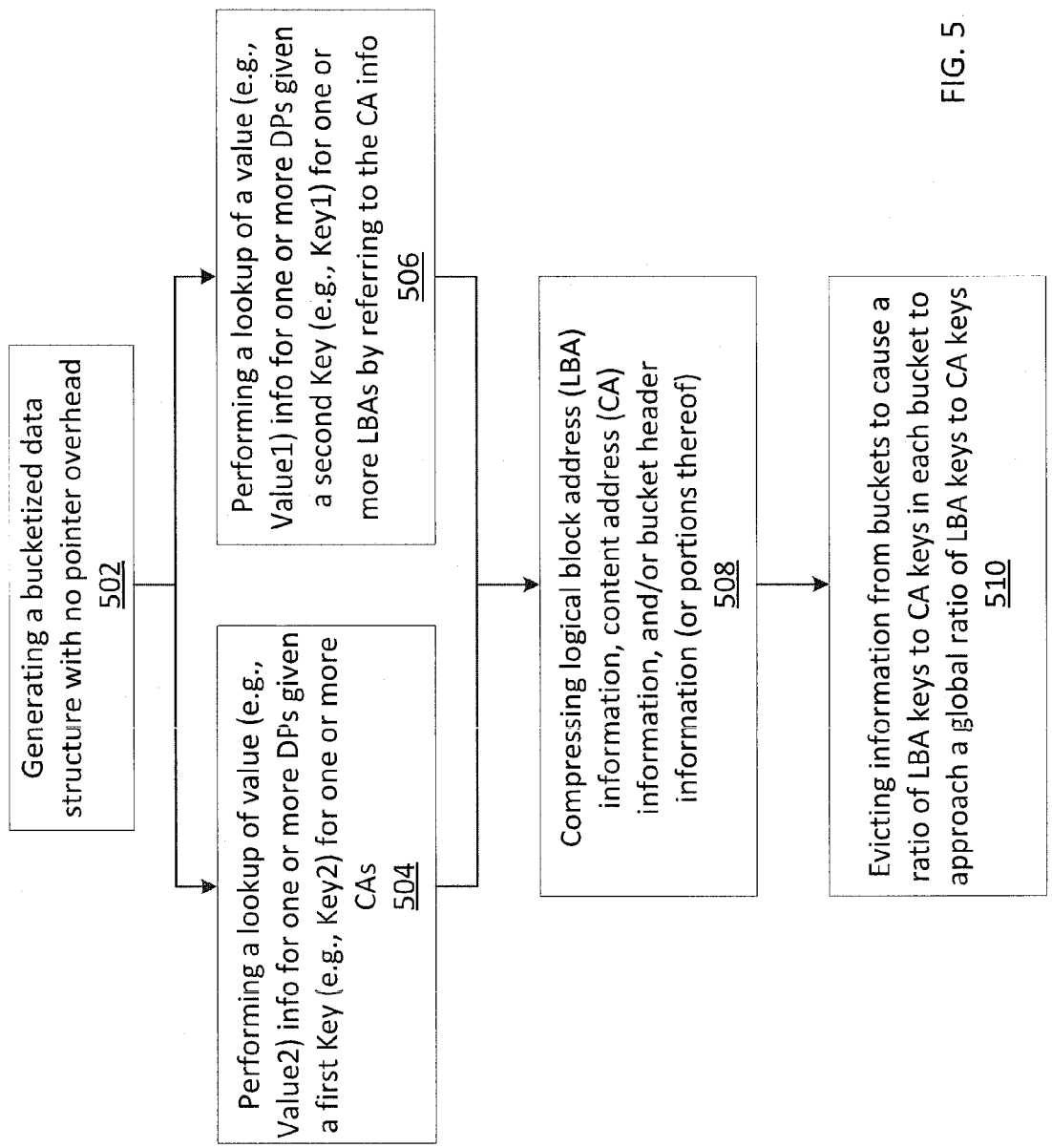
FIG. 5 shows a block/flow diagram illustrating a method for reducing memory and resource costs for bucketized multi-index data structures storing multiple key types in each bucket according to the present principles.

Referring now to FIG. 5, a method for reducing memory and resource costs for bucketized multi-index data structures storing multiple key types in each bucket is illustratively depicted according to the present principles. In one embodiment, a bucketized data structure with minimal or no pointer overhead (e.g., hash table) may be generated in block 502, and may include operations with d-left hash tables to begin the bucketized data structure. The memory in the bucketized data structure may operate with statically allocated memory, and keys of different types may share the same buckets.

A lookup of value (e.g., Value2) info for one or more DPs given a Key (e.g., Key2) for one or more CAs may be performed in block 504, and a lookup of a value (e.g., Value1) info for one or more DPs given a different Key (e.g., Key1) for one or more LBAs by referring to the CA info may be performed in block 506. Compression of LBA information, CA information, and/or bucket header information (or portions thereof) may be performed on a per-bucket basis in block 508. Value1 information for LBA, which points to CA information, may occupy a relatively small number of bits (e.g., CA bucket and CA signature bits). The amount of LBA information vs. CA information (e.g., ratio of LBA keys to CA keys globally) may be unknown, and may vary in time according to one embodiment of the present principles.

In one embodiment, information may be evicted from buckets in block in a manner which causes the ratio of LBA keys to CA keys in each bucket to approach the global ratio of LBA keys to CA keys in block 510. In this way, space wasted due to improperly sized data structures is kept minimal, without any requirements for resizing of any individual data structures as in the conventional (e.g., two-data-structures) approach. The system and method according to the present principles enables strictly bounded memory resource usage, with no increased operational latency as there is no waiting for data structure resizing or reallocation according to the present principles. In particular, it solves an important problem for deduplicating caches, wherein the amount of deduplication (e.g., ratio of CAs to LBAs) is dependent on the type of workload accessing a storage system, and may vary in time. It enables statically allocated data structures to respond with low latency and low wasted space due to assigning predefined amounts of storage to CA and LBA information.

In another embodiment, wasted resources may occur if total memory size for LBA and CA information is mismatched to the number of items for which space may be allocated on an SSD. Embodiments addressing this may employ additional memory bits to provide buckets of variable size instead of fixed size. As discussed above, allowing buckets to grow in size may also include increasing the bit-lengths of signatures to maintain sufficiently probably correct behavior. When used in conjunction with maintaining a proper LBA to CA ratio, resizable buckets may allow more complete usage of all SSD space. Such embodiments may be useful with uncompressed blocks, where the number of CAs required may be commensurate with available SSD space.

In one embodiment, the amount of memory used for LBA information may be varied to respond to deduplicated ratio changes and/or statistical outliers in the numbers expected randomly hashed LBAs per bucket. For compressed block storage, the numbers of CAs and LBAs to enable a lower wastage of both SSD and memory resources may both vary, since the average deduplication ratio and average compressed size of data blocks may slowly change over time. In this case, some embodiments according to the present principles may choose to provide buckets for storing keys of multiple types which may be additionally equipped with a resizable capacity. Although the first discussed embodiment does not employ resizable buckets (due in part to an emphasis on using a bare minimum of memory resources in a pointerless implementation), other sorts of configurations including employing resizable buckets (as discussed above) may also be employed according to the present principles.

Figure 6:
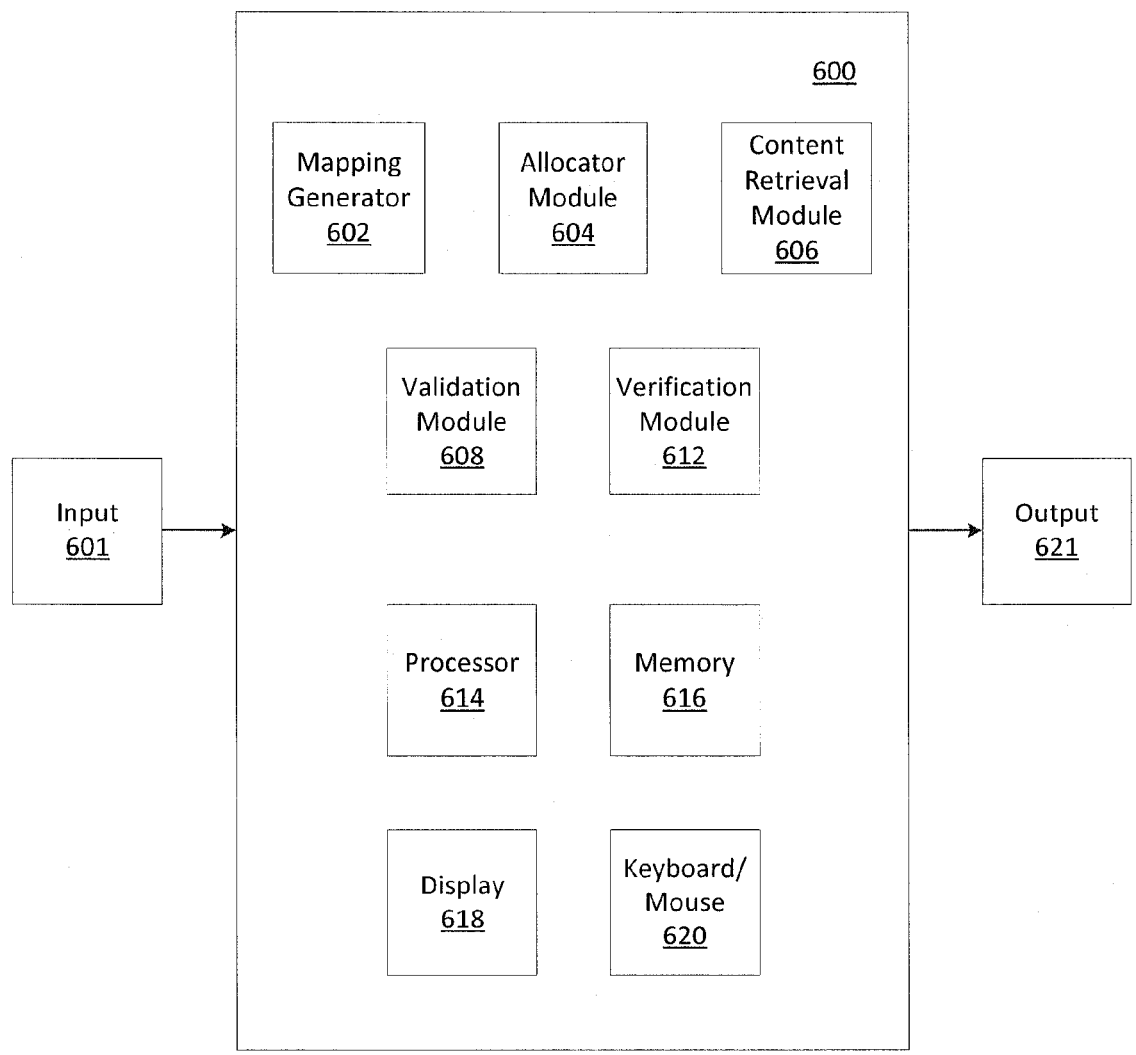
FIG. 6 shows a block/flow diagram illustrating a system for reducing memory and resource costs for multi-index data structures according to the present principles.

Referring now to FIG. 6, a system for generating and storing a data structure for maintaining a cache supporting compression and a cache-wide deduplication 600 is illustratively depicted according to the present principles. In one embodiment, data is received as input in block 601, and data is output in block 621. One or more data structures with fixed size memory regions 616 may be configured to hold multiple signatures as keys, wherein the number of the fixed size memory regions is bounded is employed. A mapping generator 602 may generate a first mapping from short-length signatures to a storage location and a quantized length measure on a cache storage device, and may generate a second mapping from short-length signatures to entries in the first mapping, wherein one or more pointers to entries in the first mapping are stored.

An allocator module 604 may allocate unused contiguous regions on the cache storage device of a predetermined length, a content retrieval module 606 may retrieve metadata and cache page content using a single input/output operation, a validation module 608 may validate a correctness of a full value of one or more hash functions of uncompressed cache page content using the metadata, and a verification module 612 may verify whether the cached page content corresponds to a full-length original logical block address (LBA) using the metadata. The system 600 may include one or more processors 614, one or more displays 618, and/or one or more keyboards and/or mice 620 according to the present principles.

Having described preferred embodiments of a system and method for a bucketized multi-index low-memory data structure configured to store multiple keys (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for generating and storing a data structure for maintaining a cache supporting compression and a cache-wide deduplication, comprising:
generating data structures with fixed size memory regions configured to hold multiple signatures as keys, wherein the number of the fixed size memory regions is bounded;
generating a first mapping from short-length signatures to a storage location and a quantized length measure on a cache storage device;
retrieving metadata and cache page content using a single input/output operation;
validating a correctness of a full value of one or more hash functions of uncompressed cache page content using the metadata;
generating a second mapping from the short-length signatures to entries in the first mapping, wherein one or more pointers to the entries in the first mapping are stored in a non-transitory computer readable storage medium,
wherein the first and second mappings are statically sized, relative to memory allocated and a number of contents, d-left hash tables with zero internal pointer overhead, wherein the statically sized d-left hash tables are never resized or reallocated; and
verifying whether the cached page content corresponds to a full-length original logical block address (LBA) using the metadata.

2. The method as recited in claim 1, wherein the storage location information and the quantized length measure information is stored in a compressed format.

3. The method as recited in claim 1, wherein the cache page content is stored in a compressed format.

4. The method as recited in claim 1, wherein unused contiguous regions on the cache device of a predetermined length are allocated.

5. The method as recited in claim 1, wherein the pointer to the entries in the first mapping is stored with a lower number of bits than a memory pointer.

6. The method as recited in claim 5, wherein a bounded-length search is employed to locate a matching entry.

7. A system for generating and storing a data structure for maintaining a cache supporting compression and a cache-wide deduplication, comprising:
one or more data structures with fixed size memory regions configured to hold multiple signatures as keys, wherein the number of the fixed size memory regions is bounded;
a mapping generator configured to generate a first mapping from short-length signatures to a storage location and a quantized length measure on a cache storage device, and to generate a second mapping from the short-length signatures to entries in the first mapping, wherein one or more pointers to the entries in the first mapping are stored,
wherein the first and second mappings are statically sized, relative to memory allocated and a number of contents, d-left hash tables with zero internal pointer overhead, wherein the statically sized d-left hash tables are never resized or reallocated;
a content retrieval module configured to retrieve metadata and cache page content using a single input/output operation;
a validation module configured to validate a correctness of a full value of one or more hash functions of uncompressed cache page content using the metadata; and
a verification module configured to verify whether the cached page content corresponds to a full-length original logical block address (LBA) using the metadata.

8. The system as recited in claim 7, wherein the storage location information and the quantized length measure information is stored in a compressed format.

9. The system as recited in claim 7, wherein the cache page content is stored in a compressed format.

10. The system as recited in claim 7, wherein unused contiguous regions on the cache device of a predetermined length are allocated.

11. The system as recited in claim 7, wherein the pointer to the entries in the first mapping is stored with a lower number of bits than a memory pointer.

12. The system as recited in claim 11, wherein a bounded-length search is employed to locate a matching entry.

* * * * *